United States Patent [19]

Lembo

[11] Patent Number: 5,526,158
[45] Date of Patent: Jun. 11, 1996

[54] LOW-BIAS HETERODYNE FIBER-OPTIC COMMUNICATION LINK

[75] Inventor: Lawrence J. Lembo, Torrance, Calif.

[73] Assignee: TRW Inc., Redondo Beach, Calif.

[21] Appl. No.: 334,839

[22] Filed: Dec. 22, 1994

[51] Int. Cl.⁶ .................. H04B 10/148; H04B 10/04; H04B 10/18
[52] U.S. Cl. .................. 359/161; 359/181; 359/173; 359/191
[58] Field of Search .................. 359/190–192, 359/161, 180, 181, 173

[56] References Cited

U.S. PATENT DOCUMENTS

| | | | |
|---|---|---|---|
| 4,769,853 | 9/1988 | Goodwin et al. | 455/616 |
| 4,893,352 | 1/1990 | Welford | 455/610 |
| 4,965,857 | 10/1990 | Auracher et al. | 455/618 |
| 5,003,624 | 3/1991 | Terbrack et al. | 455/618 |
| 5,008,958 | 4/1991 | Cimimi, Jr. et al. | 455/619 |
| 5,060,225 | 10/1991 | Godfrey | 359/3 |
| 5,121,241 | 6/1992 | Veith | 359/152 |
| 5,144,468 | 9/1992 | Weverka | 359/173 |
| 5,315,422 | 5/1994 | Utaka et al. | 359/107 |
| 5,321,543 | 6/1994 | Huber | 359/187 |
| 5,325,226 | 6/1994 | Khoe | 359/189 |

FOREIGN PATENT DOCUMENTS

| | | | |
|---|---|---|---|
| 0527350 | 2/1993 | European Pat. Off. | |
| 0018157 | 1/1987 | Japan | 359/191 |

OTHER PUBLICATIONS

William S. C. Chang, *Analog Modulation with Large Linear Dynamic Range*. 3rd Annual DARPA Symposium on Photronics Systems, Jan. 1993, Monterey, CA.

Eric A. Swanson et al., *Heterodyne Spatial Tracking System for Optical Space Communication* IEEE Trans. on Communications, vol. COM–34, No. 2, Feb. 1986, pp. 118–125.

Hodgkinson, "Polarisation Insensitive Heterodyne Detection Using Polarisation Scrambling", 6th International Conference on Integrated Optics and Optical Fiber Communications Tech Digest, 19–22 Jan. 1987 pp. 62–65.

Primary Examiner—Leslie Pascal

[57] ABSTRACT

An optical communication link having an overall linear transfer characteristic and high dynamic range suitable for transmitting analog signals. The link includes an optical intensity modulator, such as a Mach-Zehnder modulator, biased to a low-bias point to reduce noise, and a detector that performs optical heterodyning to recover a transmitted modulating signal. Heterodyning produces a beat frequency signal and sidebands that contain the same information as the modulating signal, but without second-harmonic distortion components. Use of the low-bias point is known to reduce noise and increase dynamic range, but only at the expense of second-harmonic distortion because the modulator output is a function of the square of the modulating signal. Although second harmonics can be filtered out, the bandwidth of the modulating signal is then limited to less than an octave. In the communication link of the invention, heterodyning produces sidebands that vary with the square root of the modulator transmission characteristic. Therefore, the overall transfer characteristic is substantially linear, second harmonic distortion is eliminated, and the modulating signal can extend over a multi-octave bandwidth.

11 Claims, 7 Drawing Sheets

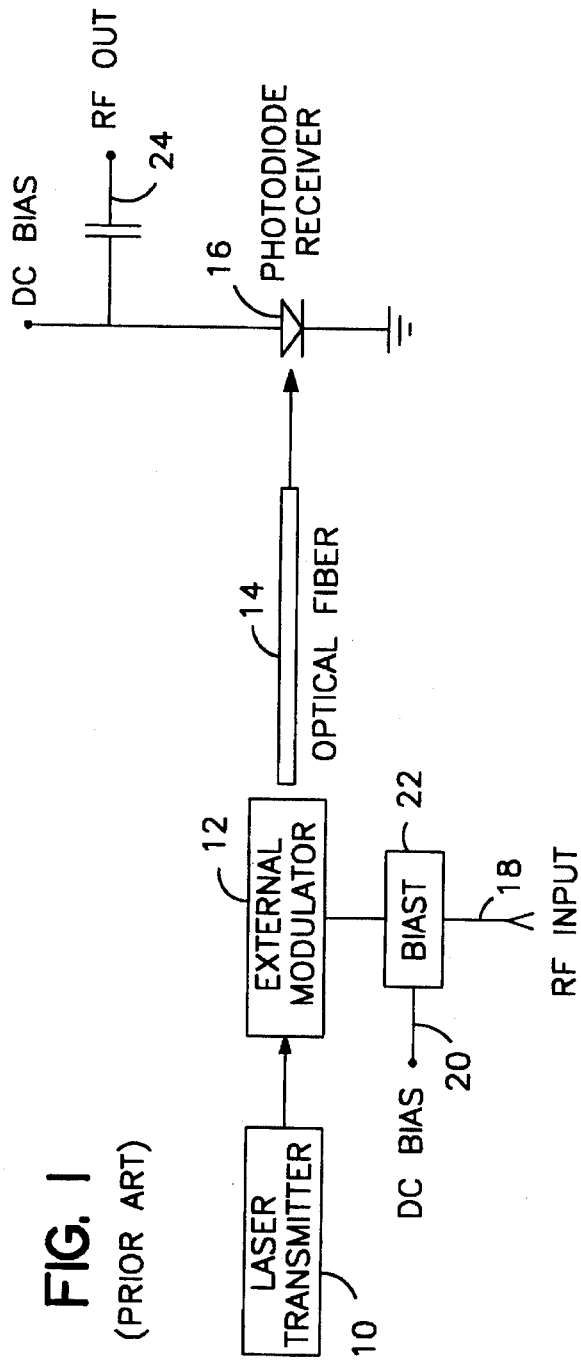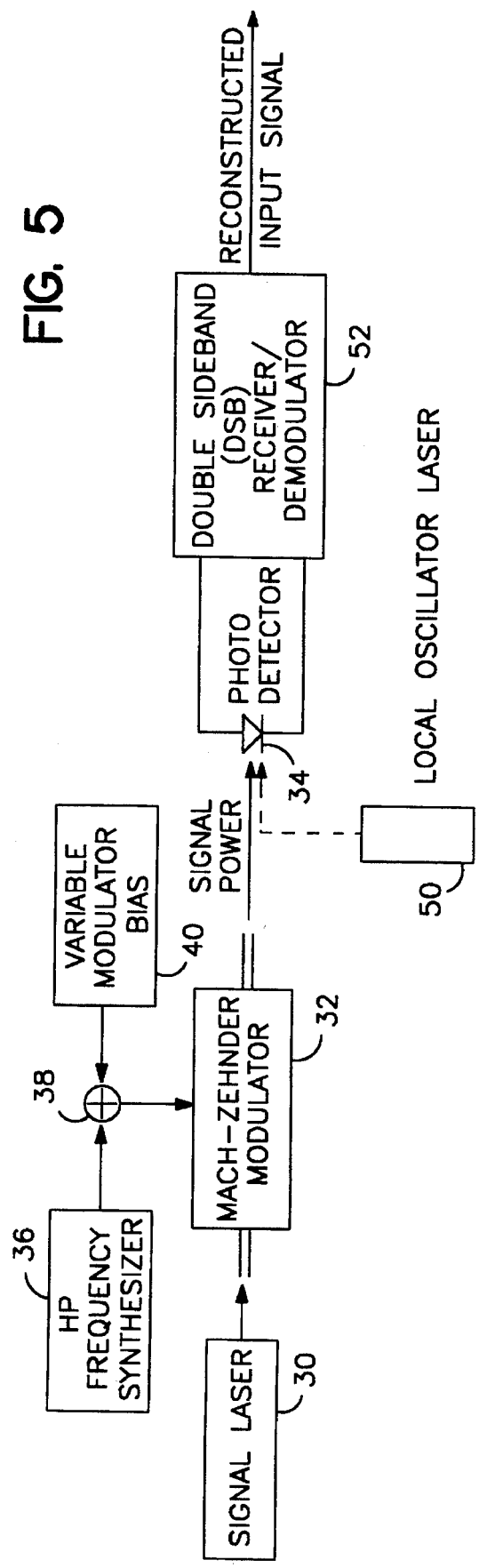

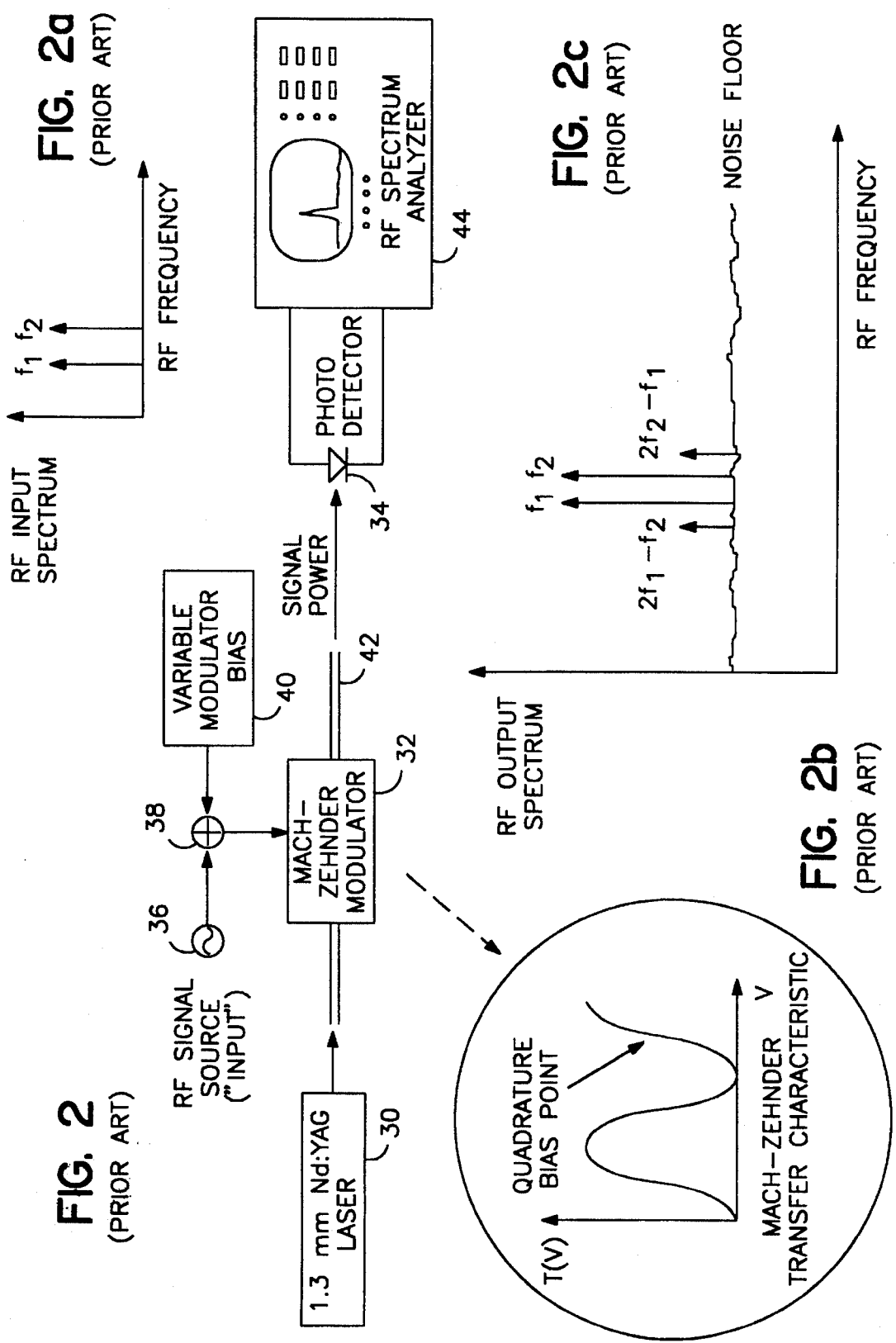

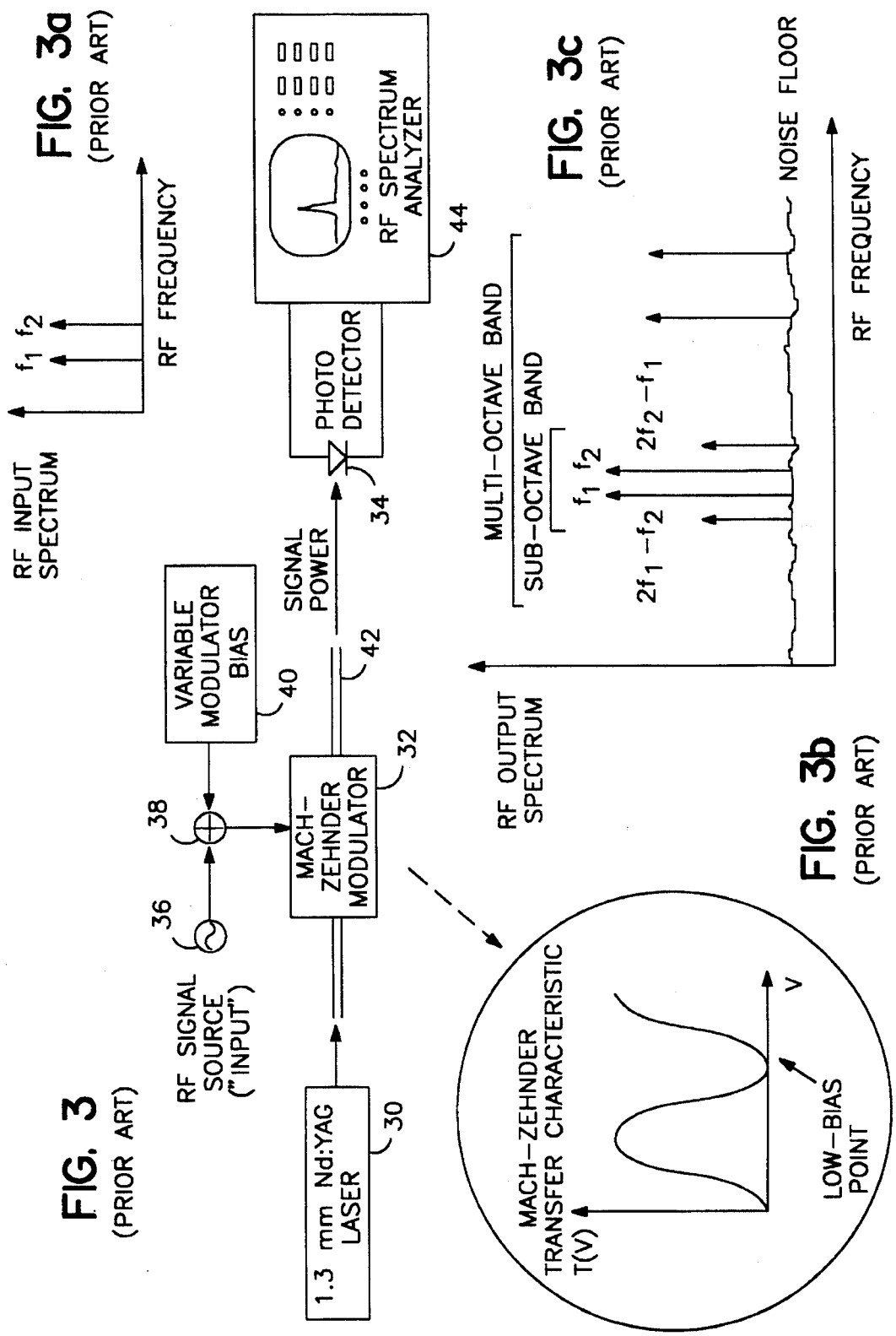

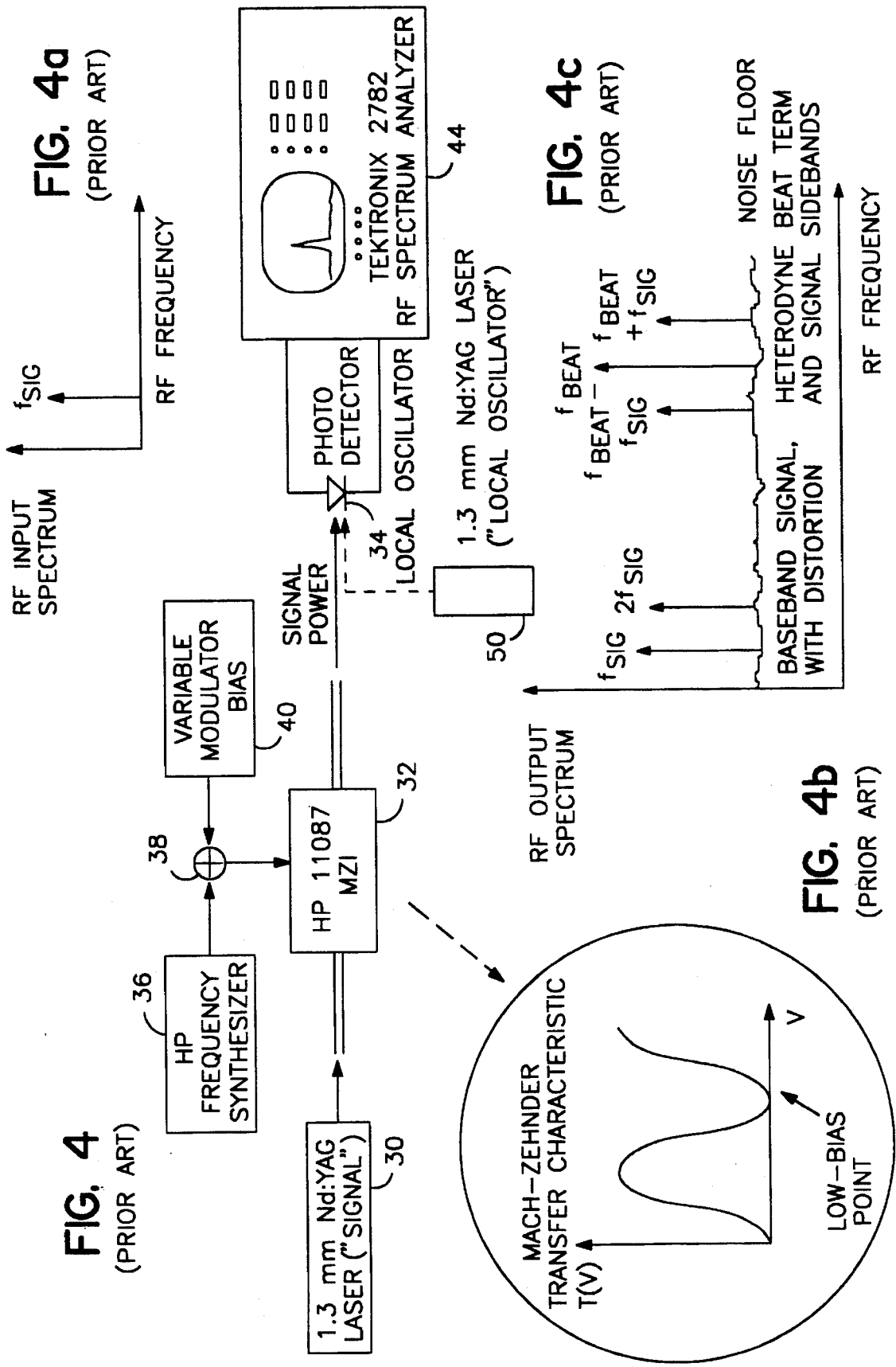

LOW-BIAS HETERODYNE FIBER-OPTIC COMMUNICATION LINK

BACKGROUND OF THE INVENTION

This invention relates generally to transmission of signals carried on a modulated light beam and, more particularly, to techniques for improving the performance characteristics of optical signal transmission systems. There are a number of applications that benefit from the use of an optical-frequency carrier for the transmission of data signals of various types. Optical communication signals are immune to electromagnetic interference and provide a very wide bandwidth. Moreover, optical signals may be conveniently transmitted through light-weight fibers. Fiber-optic communication links are already widely used for the transmission of digital data, and would also be of substantial value for analog signal transmission, except that the performance of such systems for analog signal transmission has significant limitations.

An important measure of the performance of a communication link is its dynamic range, which may be defined as the ratio of the largest signal that can be transmitted without harmonic distortion to the smallest signal that can be transmitted and still detected above a noise level inherent to the link. The dynamic range is usually expressed as a ratio of signal powers, in decibels (db). A major source of signal distortion is the process by which the analog signal to be transmitted is encoded as modulation onto the optical carrier signal. Intensity modulation of a light beam is typically performed by means of a Mach-Zehnder modulator. The modulated optical signal is then transmitted over an optical fiber. At a receiver, the optical signal is demodulated, usually by means of a photodetector. The transfer characteristic of a Mach-Zehnder modulator device is nonlinear over most of its range. More specifically, the transfer characteristic varies almost sinusoidally with applied voltage. The conventional approach to modulation using a Mach-Zehnder modulator has been to bias the device electrically to a near-linear region of the transfer characteristic curve. This bias point is usually referred to as the quadrature bias point. Use of this bias point has the advantage that second harmonics and all other even higher-order harmonics are virtually eliminated from the output of the communication link. Other forms of distortion remain, specifically two-tone intermodulation tones caused by interaction of two modulating signals of different frequencies, but these are lower in power than a second-harmonic component would be, so a larger maximum power signal can be transmitted without distortion, as compared with the maximum power that could be transmitted if second harmonic distortion were present.

The conventional approach to increasing dynamic range in an optical communication link has been to find a way to increase the maximum power that can transmitted without distortion. Using the quadrature bias point of a Mach-Zehnder modulator is consistent with this approach. It is widely believed that any further improvement in dynamic range can be obtained only by developing a light intensity modulator that has a linear transfer characteristic over a wide operating range, but such a perfectly linear modulator has yet to be developed.

The dynamic range of an optical communication link may also be increased by reducing the noise level inherent in the link and its associated components. One way to do this is to bias a Mach-Zehnder modulator at a different point in its transfer characteristic, referred to as the low-bias point. By operating at this bias point, the effective noise floor of the system is reduced without increasing the power of the two-tone intermodulation components. However, second-harmonic tones are generated in the output. The second harmonics can be easily filtered out, leaving the original modulating frequencies and the two-tone intermodulation components. The overall result is an increased dynamic range, but at the expense of bandwidth. If the modulating signals exceed one octave, some of the modulating frequencies will be lost in the filtering step needed to eliminate the second harmonics. Therefore, the system is limited to a sub-octave band of modulating signals.

Another approach to extending the dynamic range of externally modulated fiber-optic links is to cascade two Mach-Zehnder modulators and adjust the bias of both devices to eliminate both second- and third-order distortion. Any improvement is obtained at the expense of increased optical insertion loss, increased control complexity, and decreased bandwidth. Yet another approach is to adjust the polarization state of the light input to a Mach-Zehnder modulator. This also complicates bias control and is not a satisfactory solution.

It will be appreciated from the foregoing that there is still a need for further improvement in fiber-optic communication links for transmitting analog signals. In particular, what is needed is a technique for providing increased dynamic range even when the modulating signals extend over a multi-octave bandwidth. The present invention is directed to this end.

SUMMARY OF THE INVENTION

The present invention resides in an optical communication link that combines a nonlinear optical intensity modulator and an optical heterodyne detector, to achieve a linear overall transfer characteristic. Briefly, and in general terms, the communication link of the invention comprises a laser transmission medium having a transmitter end and a receiver end; a laser source located at the transmission end of the transmission medium; and a light intensity modulator coupled to receive light from the laser source and an input electrical signal to be transmitted. The light intensity modulator has a transmission function that varies in approximate proportion to the square of the input electrical signal. The link further includes a second laser source located at the receiver end of the transmission medium and having a frequency that is offset by a selected fixed amount from that of the laser source at the transmission end; a photodetection device located at the receiving end of the transmission medium; and means for optically heterodyning light received from the transmission medium with light emitted by the second laser source and directing light from both laser sources onto the photodetection device. Heterodyning results in generation of a signal at a beat frequency and additional signals in upper and lower sidebands. Information contained in the input electrical signal is also contained in, and recoverable from, the upper and lower sidebands of the beat frequency signal. However, second harmonic distortion components are absent from the upper and lower sidebands because the overall transfer function of the modulator and the means for heterodyning is substantially linear. Contrary to usual practice, the modulator is biased to operate at a nonlinear portion of its characteristic curve, and the transmission characteristic of the modulator varies approximately as the square of the modulating signal. Because heterodyning detection produces an output that varies in proportion to the square root of the modulator transmission characteristic, the overall transfer function of the link is substantially linear.

In the illustrative embodiment of the invention, the light intensity modulator is of the Mach-Zehnder type. The link further comprises a source of electrical bias voltage applied to the modulator with the input electrical signal, and the bias voltage is selected to bias the modulator to a low-bias point, resulting in practically zero transmission of light when the input electrical signal has a zero value.

In another disclosed embodiment, the invention further includes a double-sideband electronic demodulator, which recovers the original electrical input signal from the sideband signals generated by heterodyning. A further advantage of this technique is obtained by using the beat frequency signal as a reference tone in the double-sideband demodulator. Any drift in frequency of either of the laser light sources will affect the beat frequency signal and the sideband signals equally, so that optical frequency drift is automatically compensated in the demodulator.

The invention may also be defined as a method of operation of a fiber-optic communication link. The method comprises the steps of coupling an optical carrier signal from a transmitter laser source to a light intensity modulator; coupling an input electrical signal to the modulator; modulating the intensity of the optical carrier signal, wherein the modulated output optical signal is a function of approximately the square of the input electrical signal; transmitting the modulated optical signal through a transmission medium; and heterodyning the modulated optical signal with an optical signal generated by a second laser source having a frequency that is offset by a selected fixed amount from that of the transmitter laser source. The step of heterodyning inherently includes generating a signal at a beat frequency and generating additional signals in upper and lower sidebands of the beat frequency. The method further includes the steps of directing light from the heterodyning step onto a photodetector; converting optical signals to electrical signals in the photodetector; and recovering the input electrical signal from at least one sideband generated as a result of the heterodyning step. The sidebands are free of second harmonic distortion because the overall transfer function of the link is substantially linear.

In the illustrative embodiment of the method, the step of modulating includes biasing the modulator to a low-bias point at which there is practically zero transmission of light in the absence of an input electrical signal. Biasing the modulator includes generating a selected bias voltage, combining the bias voltage with the input electrical signal and applying the resulting signal to the modulator.

It will be appreciated that the present invention represents a significant advance in the field of optical transmission of analog information signals. In particular, the invention provides a communication link with a higher dynamic range than is normally available because noise in the link is reduced without introducing second harmonic distortion. Other aspects and advantages of the invention will become apparent from the following more detailed description, taken in conjunction with the accompanying drawings.

BRIEF DESCRIPTION OF THE DRAWINGS

FIG. 1 is a block diagram showing the basic elements of a fiber-optic communication link;

FIG. 2 is a block diagram of a fiber-optic communication link of the prior art, in which a Mach-Zehnder modulator is biased at the quadrature bias point to eliminate generation of second harmonics;

FIG. 2a is a graphical representation of an input spectrum containing two frequencies, as input to the communication link of FIG. 2;

FIG. 2b is a graph of the transfer characteristic of the Mach-Zehnder modulator of FIG. 2;

FIG. 2c is a graphical representation of an output spectrum pertaining to the communication link of FIG. 2;

FIG. 3 is a block diagram of a fiber-optic communication link of the prior art, in which a Mach-Zehnder modulator operates in the low-biased mode, to reduce noise;

FIG. 3a is a graphical representation of an input spectrum containing two frequencies, as input to the communication link of FIG. 3;

FIG. 3b is a graph of the transfer characteristic of the Mach-Zehnder modulator of FIG. 3;

FIG. 3c is a graphical representation of an output spectrum pertaining to the communication link of FIG. 3, showing the presence of second harmonic components;

FIG. 4 is a block diagram of a fiber-optic communication link in accordance with the present invention, in which a Mach-Zehnder modulator operates in the low-biased mode, to reduce noise, and in which optical heterodyning is used to eliminated second harmonic distortion;

FIG. 4a is a graphical representation of an input spectrum containing a single frequency by way of example, as input to the communication link of FIG. 4;

FIG. 4b is a graph of the transfer characteristic of the Mach-Zehnder modulator of FIG. 4;

FIG. 4c is a graphical representation of an output spectrum pertaining to the communication link of FIG. 4, showing the absence of second harmonic distortion;

FIG. 5 is a representation of how the optical communication link can be deployed into a system that utilizes conventional double sideband receiver electronics;

DESCRIPTION OF THE PREFERRED EMBODIMENT

Figure 6:
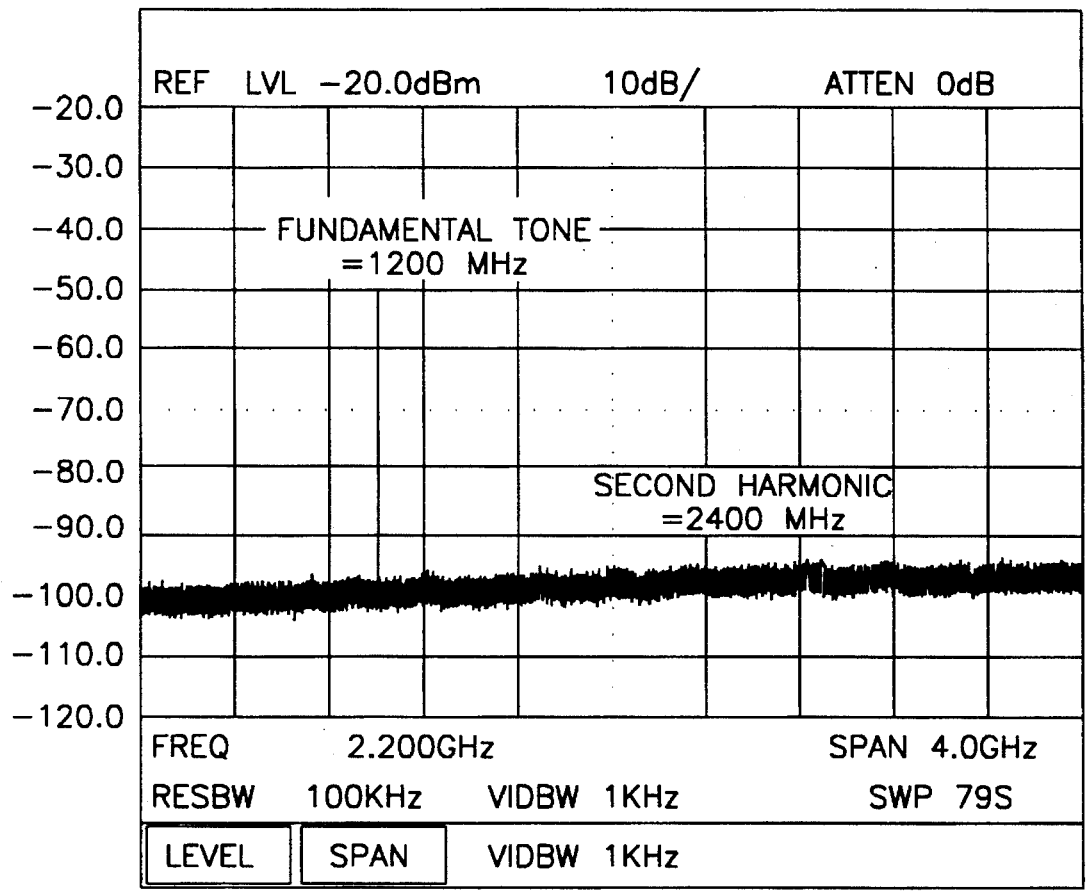
FIG. 6 is a graph of the baseband output spectrum of a quadrature-biased Mach-Zehnder modulator, as in the communication link shown in FIG. 2.

As shown in the drawings for purposes of illustration, the present invention pertains to optical communications systems and, in particular, to fiber-optic communication links using an intensity-modulated light source. FIG. 1 shows the basic elements of such a communication link, including a continuous-wave (CW) laser, indicated by reference numeral 10, a modulator 12 whose optical transmission varies with applied voltage, an optical fiber 14 through which a modulated light beam is transmitted, and a photodetector 16 to convert optical signals back into electrical form. A radio-frequency (rf) input signal, as indicated at 18, is combined with a direct current (dc) bias signal 20 in a bias circuit 22 and applied to the modulator 12. The laser 10 is coupled to the modulator through appropriate optical elements such as another optical fiber (not shown). A voltage waveform representing a signal to be transmitted is applied to the modulator 12 together with the bias signal 20. This time-varying voltage waveform results in a corresponding variation of the optical intensity output from the modulator 12 into the optical fiber 14. At a desired receiver location, the time-varying optical intensity illuminates the photodetector 16, resulting in a time-varying current waveform which, in the ideal case, is an exact reproduction of the voltage waveform that was applied to the optical modulator 12. Typically, the output current is recovered by means of a capacitively coupled output circuit 24.

In practice, the ability of the fiber-optic link to transmit signals over a fiber-optic link of this general type is limited in two respects. First, noise invariably exists in the output current of the photodetector 16. The amplitude of this noise, referred to as the noise floor, determines the smallest possible signal, $S_{min}$, that can be transmitted over the link and detected above the noise floor by the photodetector 16. Second, and at the opposite extreme of signal strengths, very large signals that are applied to the modulator 12 result in distortion, such that the time-varying optical intensity is no longer a faithful reproduction of the input voltage waveform, but contains frequency components that were not present in the original signal. The largest signal that can be transmitted over the link without unacceptably large levels of distortion is denoted $S_{max}$. An important measure of the performance of a communication link is the dynamic range, which may be defined as the ratio $S_{max}/S_{min}$.

Techniques for improving the dynamic range fall into two general categories: either to increase the maximum signal $S_{max}$ that can be transmitted without distortion or to reduce the minimum detectable signal $S_{min}$. FIGS. 2 and 3, respectively, illustrate each of these approaches.

The configuration of FIG. 2 includes a laser 30, a Mach-Zehnder optical intensity modulator 32 and a photodetector 34. For purposes of testing the system, an input signal is provided by an rf signal source 36, from which signals are transmitted to a summing circuit 38. A variable modulator bias signal source 40 is also connected to the summing circuit 38 and the output of the summing circuit is connected as an electrical input to the Mach-Zehnder modulator 32. Output from the modulator 32 is coupled to a fiber-optic cable 42 for transmission to a receiver site, which is usually remote from the transmitter. For illustration, the input signal is shown in FIG. 2a as including two separate tones at frequencies $f_1$ and $f_2$. It will be understood, of course, that in general the input signals used to modulate the laser beam may contain a broader spectrum of communication signals, such as video, audio, or other types of information signals. For test purposes, the output of the photodetector 34 is coupled to a spectrum analyzer 44, for analysis of the output signals received by the photodetector. FIG. 2c shows a typical output spectrum resulting from the input of the two signal at frequencies $f_1$ and $f_2$.

FIG. 2b shows the transfer characteristic of the Mach-Zehnder modulator 32 for a range of input voltages. It will be observed that the characteristic is approximately sinusoidal in shape. More specifically, as the applied voltage increases the transfer characteristic increases from zero to a maximum, then decreases back to zero again. An important consideration in operation a Mach-Zehnder modulator is the selection of an appropriate bias point. Traditionally, the bias point selected is approximately midway up the transfer characteristic curve, as indicated in FIG. 2b. At this point, referred to as the quadrature bias point, small variations in the applied voltage cause approximately linear, i.e. proportional, changes in the transfer characteristic and corresponding proportional changes in the output intensity of the modulator. A linear characteristic is thought to be desirable because it avoids the generation of second harmonic, and higher-order even harmonic, distortion of the signal. As shown in FIG. 2c, the only significant type of distortion that remains is two-tone intermodulation distortion. This results in the generation of tones at frequencies $(2f_1-f_2)$ and $(2f_2-f_1)$. For distortion-free operation, the input amplitudes have to be reduced sufficiently to lower these distortion components below the noise floor. The noise floor of the system is typically limited by the intensity fluctuations present in the laser 30 itself. These fluctuations give rise to current fluctuations in the output of the photodetector 34, which a real signal must overcome in order to be detected above the noise.

In the system of FIG. 3, the noise floor is decreased by changing the bias point of the Mach-Zehnder modulator 32 to a point where its transmission is decreased relative to the quadrature point used in FIG. 2. Preferably, the bias point is selected to provide a near-zero transmission when no modulating signal is present. This is referred to as the low-bias point, as shown in FIG. 3b. In this mode of operation, the fiber-optic link is capable of detecting weaker signals than when operated at the usual quadrature bias point, because the noise floor is lower. Further, because the two-tone intermodulation distortion components are the same as for the quadrature bias case, the ratio $S_{max}/S_{min}$ is increased by this approach. A significant drawback is that use of the low-bias point results in the generation of second-harmonic distortion components, as indicated in FIG. 3c. These components, at frequencies $2f_1$ and $2f_2$, have to be filtered from the output signals. Therefore, the communication link is effectively limited to a sub-octave bandwidth. Applications in which it is required or desirable to transmit signals over multiples of one octave cannot use this technique without suffering from significant second harmonic distortion.

It will be appreciated from the foregoing detailed analysis of the prior art that there is still room for improvement in communication links for transmitting analog signals by intensity-modulated optical signals. In accordance with the invention, the advantage of a reduced noise floor, which results from using a low-bias point for the modulator 32, is obtained without the unwanted presence of second harmonic distortion. As shown in FIG. 4 and FIG. 4b, the Mach-Zehnder modulator 32 is biased to the low-bias point, as in FIG. 3, but second harmonic distortion is avoided by the use of an additional component: a local optical oscillator 50, the output of which is combined with the received optical signal in a well known process referred to as heterodyning. The local oscillator 50 is a laser of the same nominal frequency as the transmitter laser 30, but which is tuned by temperature control, or other means, to have an actual frequency that is offset from that of the transmitter laser by a selected amount, such as 10 GHz (gigaHertz). Heterodyning may be accomplished in any suitable mixing device, such as an optical combiner. For heterodyning to take place, the polarization angles of the two light sources may have to be adjusted to a near match. The combined optical signals are both incident on the photodetector 34, which produces an output spectrum such as the one shown in FIG. 4c. For simplicity, a single frequency signal, $f_{sig}$ is shown as being input to the modulator 32. Because the low-bias mode of operation of the modulator 32 results in the generation of second harmonic components, the resulting baseband signals detected at the output of the photodetector 34 include the original signal at frequency $f_{sig}$ and a second harmonic component at frequency $2f_{sig}$, as shown at the lower end of the spectrum in FIG. 4c. However, the heterodyning process results in the generation of a beat frequency output at frequency $f_{beat}$, which is the offset in frequency between the transmitter laser 30 and the local optical oscillator 50.

In principle, for a modulator biased for perfectly zero transmission, the strength of the $f_{beat}$ tone at the photodetector 34 would also be zero. In practice, however, there is always some nonzero transmission of the optical signal carrier through the modulator 32, so that the $f_{beat}$ component is present with nonzero amplitude. This beat frequency may be exploited as a reference tone using conventional communications receiver electronics, which would necessarily follow the photodetector 34 in a realistic communications system.

In addition to the beat frequency tone, the heterodyning process produces upper and lower sideband components displaced in frequency above and below the beat frequency. For the case of a single-frequency input, the sidebands will be signals at frequencies $(f_{beat}+f_{sig})$ and $(f_{beat}-f_{sig})$, as also shown in FIG. 4c. Detection of the output signals can be made either at the baseband frequency level or at the heterodyne frequency level, since all the information contained in the input signal is recoverable from the sidebands of the heterodyne beat signal. By appropriate filtering, the upper or lower sideband signals may be selected for recovery of the modulation signals. Demodulation is completed by frequency down-converting the signals to the baseband level. The advantage of recovering the transmitted signals in this way is that the heterodyne signals do not contain any second harmonic distortion. Therefore, the bandwidth of the transmitted signals may extend over more than an octave.

FIG. 5 illustrates the low-biased optical heterodyne link being used as part of a more complete communications system that includes the electronics required to recover the baseband signal from the heterodyne tones. Shown following the photodetector 34 is a double-sideband (DSB) electronic receiver/demodulator 52, which is one type of conventional demodulator whose function it is to convert heterodyne signals to baseband signals. Any conventional electronic heterodyne demodulator requires the presence of a carrier reference tone in order to ensure fidelity of the recovered signal. In the case of the optical fiber link, this reference tone is provided by the mixing of the local oscillator and signal laser optical frequencies $(f_{beat})$. One potential problem often cited in the context of optical heterodyne systems is that the signal and local oscillator lasers, being situated in remote physical locations, will drift with respect to one another in optical frequency, with the result that the signal frequencies are unstable. By using the frequency $f_{beat}$ as a pilot-tone reference to the input of a conventional DSB demodulator, this problem is overcome, because the reference tone $f_{beat}$ will drift in frequency by exactly the same interval as the upper and lower sideband signal tones, so that the downconverted baseband signals will remain stable.

The lasers 30 and 50 may be selected to have any convenient wavelength. In the embodiment illustrated in FIG. 4, the lasers are each of Nd:YAG crystal (neodymium:yttrium/aluminum/garnet) and have a nominal wavelength of 1.3 μm (micrometers). It will be understood that, although the term "optical" is used to describe the communication link, the principles of the invention also apply to invisible portions of the electromagnetic spectrum, such as in the ultraviolet and infrared regions.

The mathematics of heterodyne detection help explain why the combination of a low-biased, and therefore nonlinear, Mach-Zehnder modulator and heterodyne detection results in a linear overall transfer characteristic. The current appearing at the output of the photodetector 34 when heterodyne detection is used is given by:

$$i_{total}(V) = \eta_{pd}\{P_{sig}(V) + P_{LO} + 2(P_{sig}(V) P_{LO})^{1/2} \cos(f_{beat}t)\},$$

where:

$P_{sig}(V)$=the optical power transmitted through the modulator, as modulated by input voltage V, $\eta_{pd}$=the detection efficiency of the photodetector, and $P_{LO}$=the constant optical power of the local oscillator laser.

The first term in this expression, $$i_{direct}(V) = \eta_{pd}P_{sig}(V)$$

is the contribution of the photocurrent resulting from the direct modulation of the Mach-Zehnder modulator, and gives rise to the frequency components $f_{sig}$ and $2f_{sig}$ in the spectrum of FIG. 4c. The third term in the expression is the heterodyne current component:

$$\begin{aligned} i_{het}(V,t) &= \eta_{pd} \, 2(P_{sig}(V)P_{LO})^{1/2} \cos(f_{beat}t) \\ &= \eta_{pd} \, 2(P_{incident}T(V)P_{LO})^{1/2} \cos(f_{beat}t). \end{aligned}$$

This term is responsible for the heterodyne frequency components, $f_{beat}$, $(f_{beat}-f_{sig})$ and $(f_{beat}+f_{sig})$ shown on the same spectrum of FIG. 4c. In this latter expression, T(V) is voltage-dependent transmission or transfer characteristic of the modulator and $P_{incident}$ is the optical input power to the modulator. In order to obtain distortionless operation of an optical link, it is necessary that the photocurrent show a linear variation with input voltage. For the direct photocurrent term, this means that the transmission function T(V) for the optical modulator should be linear with voltage. Various schemes have been proposed for constructing a modulator satisfying this requirement, but the ideal case of a perfectly linear characteristic cannot be achieved. For the heterodyne term in the above expression, the effective transfer characteristic is the square root of the modulator transfer characteristic. Consequently, if the photocurrent is to vary in a perfectly linear manner with respect to applied voltage, the modulator should have a transmission characteristic that varies as the square of the applied voltage, rather than linearly with the applied voltage. Such a transmission characteristic describes, in an exact analytical fashion, the low-biased mach-Zehnder modulator. Thus, by biasing the mach-Zehnder modulator at the zero-transmission point (the low-bias point) and detecting the heterodyne frequency components, a perfectly linear overall transfer characteristic can be achieved. Therefore, the second-order distortion products that plague the low-bias operation of a direct-detection optical link are absent from the heterodyne signal.

FIG. 6 shows the baseband output signals for the prior art communication link of FIG. 2, with the modulator biased at the quadrature point. A test tone of 1,200 MHz frequency is input to the link and results in a similar output tone, with an unmeasurably small second harmonic component.

Figure 7:
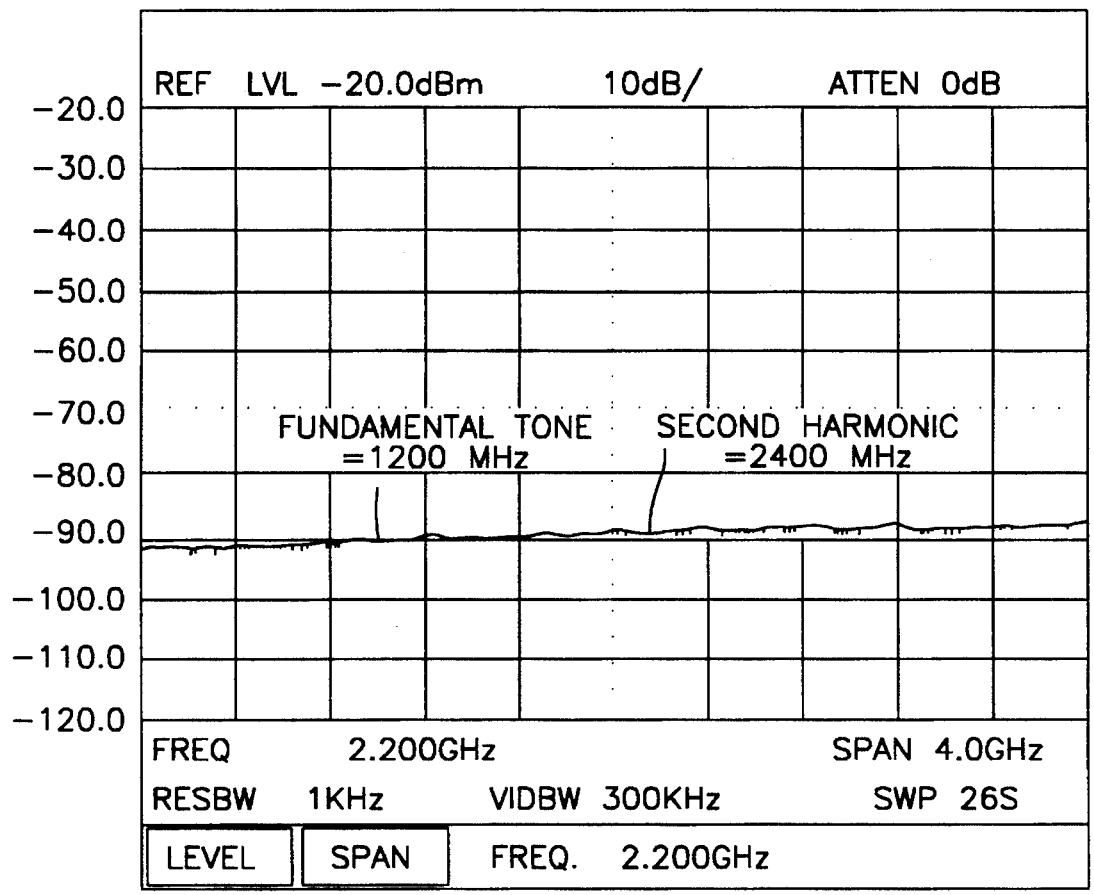
FIG. 7 is a graph of the baseband output spectrum of a low-biased Mach-Zehnder modulator in conjunction with a heterodyned detector scheme, as illustrated in FIG. 4.
Figure 8:
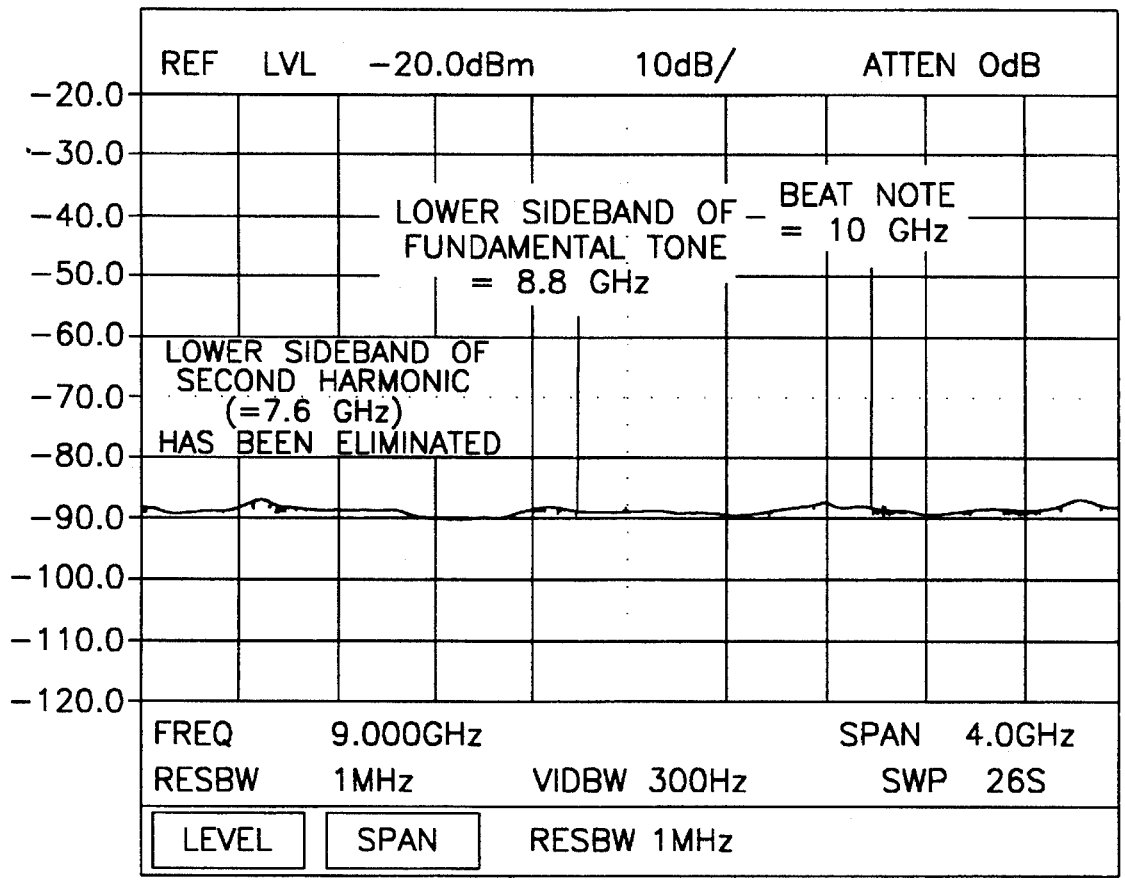
FIG. 8 is a graph of the output spectrum of the heterodyne detector shown in FIG. 4.

FIGS. 7 and 8 show the baseband and heterodyne output spectra, respectively for a communication link like the one shown in FIG. 4, again using an input tone of 1,200 MHz. This is the input signal $f_{sig}$ in FIGS. 4a and 4c. The local oscillator 50 is tuned to provide a frequency offset, and hence a beat frequency component, at a frequency of 10 GHz. At baseband, there is a fundamental tone at 1,200 MHz and a second harmonic at 2,400 MHz, so detection at baseband is limited to suboctave bandwidths. At heterodyne frequency levels, as shown in FIG. 8, there is a beat frequency at 10 GHz and a lower sideband tone at 8.8 GHz (10 GHz−1.2 GHz). The upper sideband is not shown, but one is present at 11.2 GHz. There is no observable signal component at the second harmonic lower sideband frequency, 7.6 GHz (10 GHz−2.4 GHz), confirming that the second harmonic distortion has been eliminated and the effective transfer characteristic of the communication link is linear.

It will be appreciated from the foregoing that the present invention represents a significant advance in the field of optical communication links for the transmission of analog signals. In particular, the invention provides an increased dynamic range by lowering the noise floor of the system without introducing second harmonic distortion. In effect, the invention combines the advantages of a low-biased Mach-Zehnder modulator, which lowers the noise floor, with a quadrature-biased modulator, which eliminates second harmonic distortion. Prior to this invention, it was thought that one could not lower the noise floor in a modulator without introducing second harmonic distortion, and that one could not eliminate second harmonic distortion without raising the noise floor. The present invention achieves both advantages together, in a communication link with a linear overall transfer characteristic. It will also be appreciated that, although a specific embodiment of the invention has been described in detail for purposes of illustration, various modifications may be made without departing from the spirit and scope of the invention. Accordingly, the invention should not be limited except as by the appended claims.

I claim:

1. An optical communication link, comprising:

a laser transmission medium having a transmitter end and a receiver end;

a laser source located at the transmission end of the transmission medium;

a light intensity modulator coupled to receive light from the laser source and an input electrical signal to be transmitted, wherein the light intensity modulator has a transmission characteristic that varies in approximate proportion to the square of the input electrical signal;

a second laser source located at the receiver end of the transmission medium and having a frequency that is offset by a selected fixed amount from that of the laser source at the transmission end;

a photodetection device located at the receiving end of the transmission medium;

means for optically heterodyning light received from the transmission medium with light emitted by the second laser source and directing light from both laser sources onto the photodetection device, wherein heterodyning results in generation of a signal at a beat frequency and additional signals in upper and lower sidebands, and wherein the means for heterodyning interposes a square-root transfer characteristic and;

an electronic demodulator, connected to receive input from the photodetection device, to recover input electrical signal information from at least one of the upper and lower sidebands of the beat frequency signal;

whereby second harmonic distortion components are absent from the upper and lower sidebands because the overall transfer characteristic of the optical communication link, including the modulator and the means for heterodyning, is substantially linear.

2. An optical communication link as defined in claim 1, wherein:

the light intensity modulator is of Mach-Zehnder type; and the communication link further comprises a source of electrical bias voltage applied to the modulator with the input electrical signal;

wherein the bias voltage is selected to bias the modulator to a low-bias point resulting in practically zero transmission of light when the input electrical signal has a zero value.

3. An optical communication link as defined in claim 2, wherein:

the transmission medium is an optical fiber.

4. An optical communication link as defined in claim 1, wherein:

the electronic demodulator is a double-sideband electronic demodulator, and the beat-frequency signal is used as a reference tone in the demodulator and any drift in optical frequencies of the laser sources will be compensated automatically in the demodulator.

5. A fiber-optic communication link having a substantially linear overall transfer characteristic, comprising:

a fiber-optic transmission medium having a transmitter end and a receiver end;

a laser light source located at the transmitter end of the transmission medium;

a light intensity modulator of the Mach-Zehnder type, coupled to receive light from the laser source, to modulate the intensity of the light as a function of an input control signal, and to output the modulated light to the transmission medium;

a source of bias voltage selected to bias the modulator to a low-bias point at which light transmission is reduced to practically zero;

a signal input circuit, for combining the bias voltage with an electrical input signal to be transmitted and applying a combined input control signal to the modulator, wherein the modulator has a transmission characteristic that varies as approximately the square of the electrical input signal;

a second laser source located at the receiver end of the transmission medium and having a frequency that is offset by a selected fixed amount from that of the laser source at the transmission end;

a photodetector located at the receiving end of the transmission medium, for converting optical signals back into electrical signals;

means for optically heterodyning light received from the transmission medium and light emitted by the second laser source and directing light from both sources onto the photodetector, wherein heterodyning results in generation of a signal at a beat frequency that is the difference between the frequencies of the two laser sources, and additional signals in upper and lower sidebands of the beat frequency signal, and wherein the means for optically heterodyning interposes a square-root transfer characteristic; and an electronic demodulator, connected to receive input from the photodetector, to recover input electrical signal information from at least one of the upper and lower sidebands of the beat frequency signal;

whereby second harmonic distortion components are absent from the upper and lower sidebands because the overall transfer characteristic of the modulator and the means for heterodyning is substantially linear.

6. A fiber-optic communication link as defined in claim 5, wherein:

the electronic demodulator is a double-sideband electronic demodulator, connected to receive input from the photodetector, and the beat-frequency signal is used as a reference tone in the demodulator and any drift in optical frequencies of the laser sources will be compensated automatically in the demodulator.

7. A method of operation of a fiber-optic communication link having light intensity modulator and an optical heterodyne detector, the method comprising the steps of:

coupling an optical carrier signal from a transmitter laser source to a light intensity modulator;

coupling an input electrical signal to the modulator;

modulating the intensity of the optical carrier signal, wherein the modulated output optical signal is approximately a function of the square of the input electrical signal;

transmitting the modulated optical signal through a transmission medium;

heterodyning the modulated optical signal with an optical signal generated by a second laser source having a frequency that is offset by a selected fixed amount from that of the transmitter laser source, wherein the step of heterodyning inherently includes generating a signal at a beat frequency and generating additional signals in upper and lower sidebands of the beat frequency, and the step of heterodyning interposes a square root transfer characteristic;

directing light from the heterodyning step onto a photodetector;

converting optical signals to electrical signals in the photodetector; and recovering the input electrical signal from at least one sideband generated as a result of the heterodyning step, wherein the sidebands are free of second harmonic distortion because the overall transfer characteristic of the communication link is substantially linear because the square characteristic of the modulating step and the square root characteristic of the heterodyning step effectively cancel each other.

8. A method as defined in claim 7, wherein:

the step of modulating includes biasing the modulator to a low-bias point at which there is practically zero transmission of light in the absence of an input electrical signal.

9. A method as defined in claim 8, wherein:

biasing the modulator includes generating a selected bias voltage, combining the bias voltage with the input electrical signal and applying the resulting signal to the modulator.

10. A method as defined in claim 7, wherein the step of recovering the input electrical signal includes:

inputting the upper and lower sideband signals generated in the heterodyning step to a double-sideband electronic modulator;

inputting the beat frequency signal to the double-sideband modulator as a reference tone; and demodulating at least one of the upper and lower sideband signals to recover the input electrical signal.

11. A method as defined in claim 10, wherein the demodulating step includes:

automatically compensating for drift in the frequencies of the laser sources, wherein any drift in frequency will have an equal effect on the sideband signals and on the beat frequency signal used as a reference tone.

* * * * *